United States Patent
Inoue et al.

(10) Patent No.: US 9,203,271 B2
(45) Date of Patent: Dec. 1, 2015

(54) STATOR AND ROTATING ELECTRICAL MACHINE HAVING A RESIN MOLD PORTION WITH A BRIDGE

(71) Applicant: KABUSHIKI KAISHA YASKAWA DENKI, Kitakyushu-shi (JP)

(72) Inventors: Takeki Inoue, Kitakyushu (JP); Kenji Funakoshi, Kitakyushu (JP); Kazuya Yugawa, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 35 days.

(21) Appl. No.: 13/653,409

(22) Filed: Oct. 17, 2012

(65) Prior Publication Data
US 2013/0099606 A1 Apr. 25, 2013

(30) Foreign Application Priority Data
Oct. 19, 2011 (JP) ................................. 2011-230001

(51) Int. Cl.
| | | |
|---|---|---|
| *H02K 1/04* | (2006.01) | |
| *H02K 9/00* | (2006.01) | |
| *H02K 1/18* | (2006.01) | |
| *H02K 9/193* | (2006.01) | |
| *H02K 9/197* | (2006.01) | |
| *H02K 9/22* | (2006.01) | |

(Continued)

(52) U.S. Cl.
CPC .................. *H02K 1/185* (2013.01); *H02K 1/20* (2013.01); *H02K 3/38* (2013.01); *H02K 9/193* (2013.01); *H02K 9/197* (2013.01); *H02K 9/22* (2013.01); *H02K 1/04* (2013.01); *H02K 9/19* (2013.01)

(58) Field of Classification Search
CPC ............. H02K 9/19; H02K 5/20; H02K 1/04; H02K 9/193; H02K 9/197; H02K 9/22; H02K 1/185; H02K 1/20; H02K 3/38
USPC .............................. 310/52, 54, 43, 53, 58, 64
See application file for complete search history.

(56) References Cited

U.S. PATENT DOCUMENTS 4,739,204 A * 4/1988 Kitamura ............. H02K 11/046
123/41.31
6,160,332 A * 12/2000 Tsuruhara ....................... 310/54
(Continued)

FOREIGN PATENT DOCUMENTS

| | | |
|---|---|---|
| CN | 101944799 | 1/2011 |
| JP | 03-070056 U | 7/1991 |

(Continued)

OTHER PUBLICATIONS

The plastics industry trade association, Definitions of Resins—Thermoplastic Polyester (Saturated), Retrieved Oct. 1, 2014, 'http://www.plasticsindustry.org/AboutPlastics/content.cfm?ItemNumber=1413&navItemNumber=1128'.*

(Continued)

*Primary Examiner* — Joshua Benitez-Rosario
*Assistant Examiner* — Rashad Johnson
(74) *Attorney, Agent, or Firm* — Mori & Ward, LLP

(57) ABSTRACT

A stator includes a core body provided so as to contact a substantially cylindrical peripheral-wall inner surface of a frame and having a stator coil wound thereupon, and a mold portion in which a coil end of the stator coil is molded out of resin. A gap is provided between the peripheral-wall inner surface and the mold portion.

13 Claims, 2 Drawing Sheets

(51) Int. Cl.
*H02K 1/20* (2006.01)
*H02K 3/38* (2006.01)
*H02K 9/19* (2006.01)

(56) References Cited

U.S. PATENT DOCUMENTS

| | | | |
|---|---|---|---|
| 6,218,747 B1* | 4/2001 | Tsuruhara | 310/54 |
| 6,617,716 B2* | 9/2003 | Ishida | H02K 1/185 310/54 |
| 7,675,209 B2 | 3/2010 | Masoudipour | H02K 5/20 310/57 |
| 2001/0040418 A1* | 11/2001 | Higashino et al. | 310/263 |
| 2004/0124722 A1* | 7/2004 | Uchida et al. | 310/54 |
| 2011/0025147 A1* | 2/2011 | Owng | H02K 5/18 310/63 |
| 2011/0074233 A1* | 3/2011 | Okada et al. | 310/54 |
| 2011/0133582 A1* | 6/2011 | Bingler | 310/71 |
| 2012/0062047 A1* | 3/2012 | Nakagawa | H02K 9/19 310/17 |
| 2014/0111043 A1* | 4/2014 | Knappenberger | 310/65 |
| 2014/0117796 A1* | 5/2014 | Kassler | H02K 9/19 310/54 |

FOREIGN PATENT DOCUMENTS

| | | |
|---|---|---|
| JP | 2002-233107 | 8/2002 |
| JP | 2011-015578 | 1/2011 |

OTHER PUBLICATIONS

Japanese Office Action for corresponding JP Application No. 2011-230001, Aug. 13, 2013.
Chinese Office Action for corresponding CN Application No. 201210285152.1, Mar. 27, 2015.
Chinese Office Action for corresponding CN Application No. 201210285152.1, Sep. 30, 2014.
Chinese Office Action for corresponding CN Application No. 201210285152.1, Sep. 2, 2015.

* cited by examiner

STATOR AND ROTATING ELECTRICAL MACHINE HAVING A RESIN MOLD PORTION WITH A BRIDGE

CROSS REFERENCES TO RELATED APPLICATIONS

The present disclosure contains subject matter related to that disclosed in Japanese Priority Patent Application JP 2011-230001 filed in the Japan Patent Office on Oct. 19, 2011, the entire contents of which are hereby incorporated by reference.

BACKGROUND OF THE INVENTION

1. Field of the Invention

Embodiments of the disclosure relate to a stator and a rotating electrical machine.

2. Description of the Related Art

Hitherto, a stator including a core body and a mold portion has been provided. The core body is provided so as to contact an inner surface of a peripheral wall of a substantially cylindrical frame, and has a stator coil wound thereupon. The mold portion is such that a coil end of the stator coil is molded out of resin. (See, for example, Japanese Unexamined Utility Model Registration Application Publication No. 3-70056 (Patent Document 1).)

In order to cool the stator coil that generates heat, for example, a spiral cooling liquid groove is provided at an inner periphery of the frame at the stator discussed in Patent Document 1.

However, the stator discussed in Patent Document 1 is formed so that heat generated at the stator coil is easily transmitted to the frame.

SUMMARY OF THE INVENTION

According to an aspect of the present disclosure, there is provided a stator including a core body and a mold portion. The core body is provided so as to contact a cylindrical peripheral-wall inner surface of a frame and has a stator coil wound thereupon. The mold portion is such that a coil end of the stator coil is molded out of resin. A gap is provided between the peripheral-wall inner surface of the frame and the mold portion.

DESCRIPTION OF THE PREFERRED EMBODIMENTS

An embodiment of a rotating electrical machine that is disclosed in the subject application will hereunder be described in detail with reference to the attached drawings. In the embodiment, a built-in motor in which a stator and a rotor are mounted to predetermined devices is described as a rotating electrical machine. However, the present disclosure is not limited to this exemplification in the embodiment below.

Figure 1:
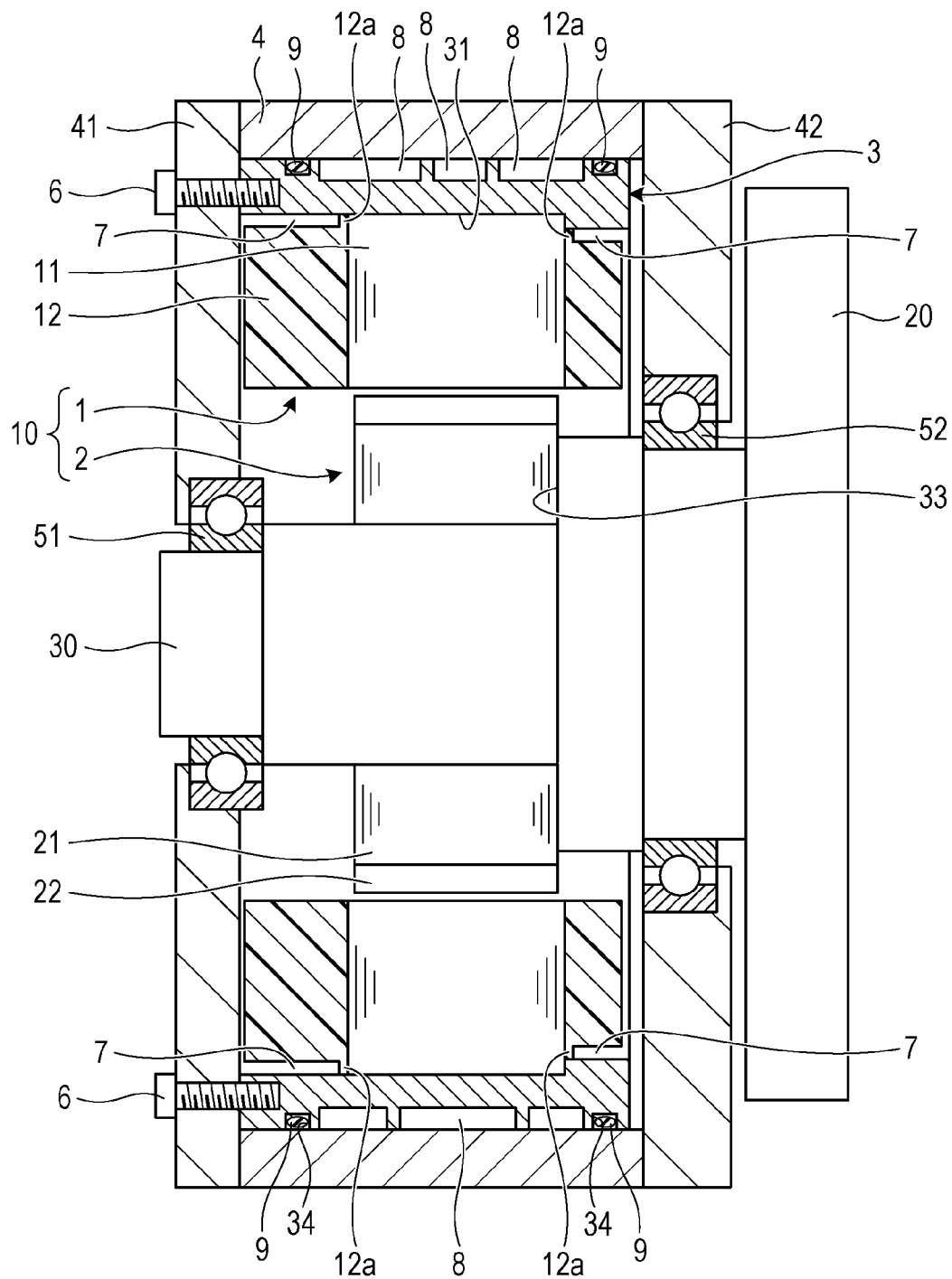
FIG. 1 is a vertical sectional view of a rotating electrical machine according to an embodiment.
Figure 2:
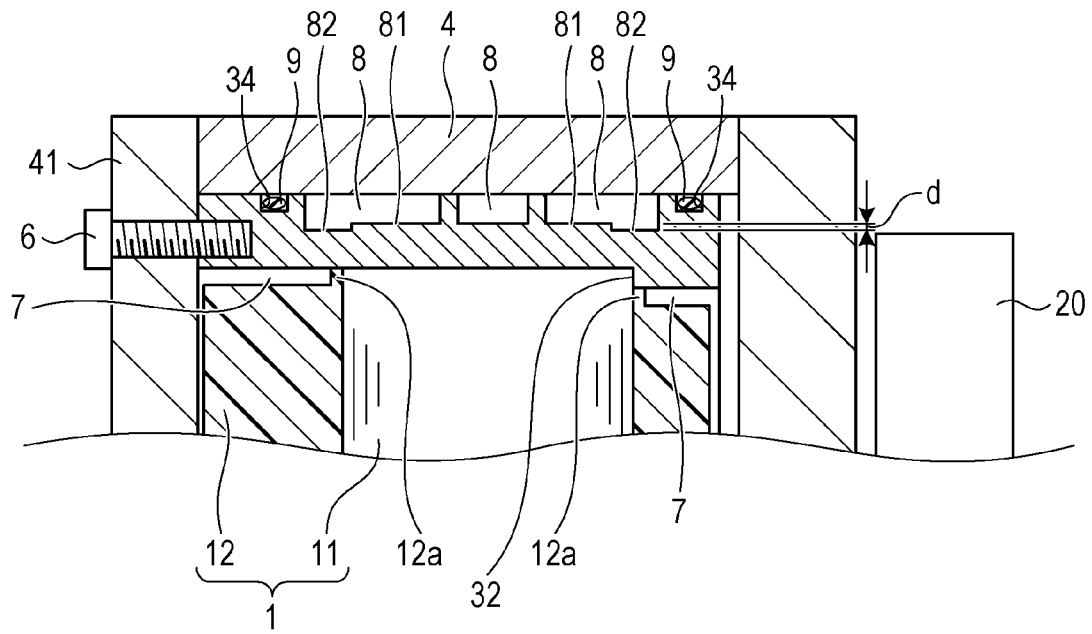
FIG. 2 is a partial enlarged view of FIG. 1.

FIG. 1 is a vertical sectional view of a rotating electrical machine according to an embodiment. FIG. 2 is a partial enlarged view of FIG. 1.

As shown in FIGS. 1 and 2, a built-in motor 10, serving as an exemplary rotating electrical machine, is a structural component of a machine tool, and is used for rotationally driving a table 20 that holds a workpiece.

That is, the built-in motor 10 according to the embodiment includes a stator 1 and a rotor 2. The stator 1 is mounted to a substantially cylindrical frame 3. The rotor 2 is mounted to a rotary shaft 30 whose end is connected to the table 20. Obviously, the built-in motor 10 may be mounted to, for example, a principal shaft to which a tool of the machine tool is mounted, instead of being mounted to the rotary shaft 30 connected to the table 20.

The stator 1 includes a core body 11 and a mold portion 12. The core body 11 is formed of a laminated core that is shrink fitted to the substantially cylindrical frame 3. The mold portion 12 is such that a coil end of a stator coil (not shown) wound upon the core body 11 is molded out of resin. That is, the stator 1 is provided so as to contact a substantially cylindrical peripheral-wall inner surface 31 of the frame 3.

The frame 3 where the stator 1 is provided has a stepped portion at a table side of the peripheral-wall inner surface 31 of the frame 3. This stepped portion is formed by forming thick the table-side of the frame 3 where the stator 1 is provided. As shown in FIG. 2, the core body 11, that is, the stator 1 is positioned by contacting an end surface of the core body 11 with a core receiving portion 32 formed at the stepped portion.

The rotor 2 includes a cylindrical rotor core 21 and a magnet 22. The magnet 22 is provided at an outer peripheral surface of the rotor core 21. The rotor 2 is concentrically mounted to the rotary shaft 30 so as to oppose the stator 1 with a slight gap therebetween. More specifically, the rotor 2 is fitted to the rotary shaft 30 through a sleeve (not shown) by, for example, shrink fitting the rotor 2 to the rotary shaft 30. The rotary core 21 may be a laminated core, or may be a part formed by shaving, for example, iron.

By such a structure, when applying current to the stator coil, rotational force is generated at the rotor 2 by magnetic pole displacement, so that the rotary shaft 30 rotates.

The rotary shaft 30 is supported by a first bracket 41 and a second bracket 42 through a first bearing 51 and a second bearing 52. The first bracket 41 and the second bracket 42 are separated by a predetermined distance. As shown in FIG. 1, a rotor receiving portion 33 that is capable of contacting an end surface of the stator core 21 is formed at the rotary shaft 30. The rotor 2 is positioned by bringing the end surface of the rotor core 21 into contact with the rotor receiving portion 33. Accordingly, the positioned stator 1 and rotor 2 oppose each other in a predetermined positional relationship.

A cylindrical housing 4 and the frame 3 are provided between the first bracket 41 and the second bracket 42 positioned adjacent to the table 20. The stator 1 is fitted to an inner peripheral surface of the frame 3 by shrink fitting the stator 1. The frame 3 is joined to the first bracket 41 with a frame mounting bolt 6.

In the embodiment, a feature of such a built-in motor 10 is the structure of the stator 1. That is, in the stator 1 according to the embodiment, a gap 7 is formed between the mold portion 12 and the substantially cylindrical peripheral-wall inner surface 31 of the frame 3.

Ordinarily, since the stator 1 is in close contact with the frame 3, heat from the stator coil is directly conducted to the frame 3. In the built-in motor 10 according to the embodiment, the gap 7, where an air layer is formed, is provided between the mold portion 12 and the peripheral-wall inner surface 31 of the frame 3. Therefore, the gap 7 makes it difficult for the heat from the stator coil of the stator 1 to be transmitted to the frame 3.

Therefore, in the case where the built-in motor 10 according to the embodiment is used, even if some problem may arise due to, for example, the influence of thermal expansion caused by the transmission of the heat of the stator 1, it is possible not to previously allow the occurrence of such a problem.

For example, even if a mechanical element or a cutting object, on which cutting is performed, that is weak even against a small amount of heat exists at the machine tool where the stator 1 is built in, it is possible not to previously allow the occurrence of various problems caused by the transmission of heat of the rotating electrical machine to the mechanical element or the object that is cut.

Figure 3:
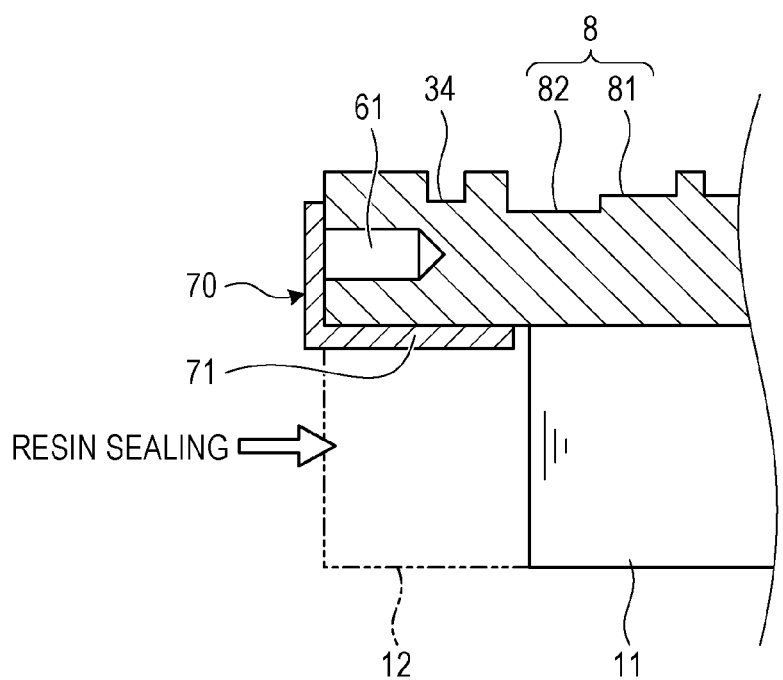
FIG. 3 illustrates a state in which a jig is mounted for forming a gap.

FIG. 3 illustrates a state in which a jig is mounted when forming the gap 7. As shown in FIG. 3, during molding of the stator coil when forming the gap 7, a substantially L-shaped mold jig 70 having a gap formation section 71 having a thickness corresponding to a desired gap thickness may be used.

When sealing of resin is performed using a predetermined die (not show) while the mold jig 70 is mounted, it is possible to form the gap 7 having the predetermined thickness between the mold portion 12 and the peripheral-wall inner surface 31 of the frame 3.

In FIG. 3, reference numeral 61 denotes a bolt hole that is internally threaded in correspondence with the frame mounting bolt 6. That is, as shown in FIGS. 1 and 2, in the built-in motor 10 according to the embodiment, the first bracket 41 is connected to an end surface of the frame 3 by the frame mounting bolt 6.

The gap 7 is not formed along an entire portion between the mold portion 12 and the peripheral-wall inner surface 31 of the frame 3. A bridge 12a that is joined to the frame 3 is formed at a core-body-11 side of the mold portion (see FIGS. 1 and 2).

That is, since an end of the mold jig 70 has a length not allowing the end of the mold jig 70 to contact the core body 11 (see FIG. 3), the bridge 12a is formed between the core body 11 and the end of the mold jig 70 during molding.

Such a bridge 12a is useful when the built-in motor 10 is mounted to the machine tool as in the embodiment. That is, when the machine tool is, for example, a cutting machine, a workpiece is cut while supplying a cutting liquid to the workpiece. Here, even if the cutting liquid enters the housing 4 or the brackets 41 and 42, since the bridge 12a exists, the cutting liquid does not flow along the peripheral-wall inner surface 31 of the frame 3 and reach the stator coil through the core body 11.

In the embodiment, the gap 7 is formed on both sides of the core body 11. However, the gap 7 may be formed on one side of the core body 11, in which case the gap 7 is formed adjacent to the table 20.

That is, in the embodiment, a mechanical element or a cutting object, on which cutting is performed, that is weak even against a small amount of heat exists adjacent to the table 20 with high probability. Therefore, it is desirable for the gap 7 that is provided for heat insulation to be formed at least adjacent to the table 20.

In addition, in the embodiment, the core receiving portion 32 that is capable of contacting the end surface of the core body 11 is formed by forming the stepped portion at the frame 3. That is, a side of the frame 3 that is close to the table 20 is thick, and the stepped portion is provided between the thick side of the frame 3 and a thin portion of the frame 3 occupying a large portion of the frame 3. The stepped portion is used to form the core receiving portion 32.

Therefore, since the table side of the frame 3 has a thick portion that makes it difficult for heat to be conducted, even if the bridge 12a that is joined to the frame 3 is formed, it is possible to suppress the conduction of heat from the mold portion 12 to the table 20.

In the stator 1 according to the embodiment, a cooling liquid path 8 for cooling the core body 11 is formed at a peripheral wall of the frame 3. At the peripheral wall of the frame 3, the cooling liquid path 8 according to the embodiment is spirally provided within a predetermined area opposite the core body 11.

That is, the cooling liquid path 8 is not provided with a gap 7 that is formed at the mold portion 12 among the mold portion 12 and the core body 11 of the stator 1. The cooling liquid path 8 is provided within a predetermined area that is set within a range of an entire length in an axial direction of the core body 11 in close contact with the peripheral-wall inner surface 31.

When a cooling liquid supplying device (not shown) is connected to a starting end of the cooling liquid path 8, and the built-in motor is operated, a cooling liquid is supplied from the cooling liquid supplying device, to cool the stator 1 from an outer peripheral side thereof. The cooling liquid is discharged from the other end of the cooling liquid path 8.

By such a structure, the heat from the core body 11 is removed by the cooling liquid flowing through the cooling liquid path 8. The cooling liquid may be a dedicated cooling liquid, cooling oil, or cooling water.

The cooling liquid path 8 may be a grooved conduit formed in the frame 3, an open conduit formed in an outer peripheral surface of the frame as in the built-in motor 10 according to the embodiment, or a closed conduit formed in the peripheral wall of the frame 3.

In this way, in the built-in motor 10 according to the embodiment, by providing the cooling liquid path 8, it is possible to suppress the conduction of heat to the machine tool, in which the stator 1 is built, through the frame 3 in cooperation with the heat conduction suppression effect of the gap 7.

When the cooling liquid path 8 is provided in the frame 3, the gradient of the temperature between the frame 3 and the stator 1 is considerably increased. That is, the frame 3 is cooled and tries to shrink, whereas the stator 1 is heated and tries to expand, as a result of which, ordinarily, a high compression stress is applied to the mold portion 12. However, since, in the built-in motor 10 according to the embodiment, the gap 7 is formed between the mold portion 12 and the peripheral-wall inner surface 31 of the frame 3, it is possible not to allow application of a high stress to the mold portion 12.

As shown in FIG. 3, a sealant mounting groove 34 is formed in an outer area of the predetermined area of the frame 3 opposite the core body 11. An O-ring 9 is mounted in the sealant mounting groove 34, so that the housing 4 and the frame 3 in which the cooling liquid path 8 is formed are watertightly in close contact with and connected to each other.

In the built-in motor 10 according to the embodiment, the cooling liquid path 8 is formed only within the predetermined area corresponding to an axial length of the core body 11, and the sealant mounting groove 34 is formed by forming it as close as possible to the predetermined area. Therefore, it is possible to reduce the axial length of the built-in motor 10. Consequently, as shown in FIG. 1, it is possible to realize a short motor structure.

When an attempt is made to suppress the conduction of heat from the stator 1 to the frame 3, it is possible to enlarge a formation area of the cooling liquid path 8. However, since the bolt hole 60 into which the frame mounting bolt 6 is screwed is formed near the end surface of the frame 3, an extra area for forming the cooling liquid path 8 does not remain in an area near the end surface of the frame 3.

Therefore, as in the built-in motor 10 according to the embodiment, the structure that is provided with the gap 7 becomes very useful. In addition, as described above, the structure that is provided with the gap 7 becomes more useful when realizing a short motor structure.

The cooling liquid path 8 according to the embodiment is such that a groove depth of a portion of the cooling liquid path 8 near the mold portion is greater than that of a remaining portion of the cooling liquid path 8.

That is, as shown in FIG. 2, at a location near the starting end of the spiral cooling liquid path 8 and a location near a trailing end of the spiral cooling liquid path 8, an ordinary groove 81 having a depth that is equal to the depth of a large portion of the cooling liquid path 8 is formed. Near the mold portion 12, a deep groove 82 that is deeper by a predetermined dimension d than the ordinary groove 81 is formed. In other words, the frame 3 is thinner at the deep groove 82 than at the ordinary groove 81, so that the cooling effect with respect to the stator 1 is increased.

In addition, in the cooling liquid path 8 according to the embodiment, the deep groove 82 is formed so that the bridge 12*a* of the mold portion 12 is positioned within the width of the deep groove 82. That is, although heat tends to be transmitted to the frame 3 at the bridge 12*a*, the cooling effect is not impaired because the deep groove 82 is formed.

Therefore, according to the stator 1 and the built-in motor 10, serving as an electrical rotating machine including the stator 1, of the embodiment, the heat generated by the stator 1 is not easily transmitted to workpieces or other mechanical elements of the machine tool. Consequently, it is possible to protect the other mechanical elements and the workpieces against various problems such as thermal expansion.

Although, in the above-described embodiment, the structure in which the cooling liquid path 8 is formed in the peripheral wall of the frame 3 is used, a structure in which the cooling liquid path 8 is not used and in which only a gap 7 is formed between the mold portion 12 of the stator 1 and the peripheral-wall inner surface of the frame 3 may be used.

When the cooling liquid path 8 is formed, it is possible not to set the groove depth near the mold portion greater than that of the remaining portion.

Other advantages and modifications of the above-described embodiment may be easily derived by those skilled in the art. Therefore, wider illustrative embodiments according to the present disclosure are not limited to the above-described particular details and typical embodiments. Therefore, various modifications can be made without departing from the scope and spirit of an all-inclusive concept of the disclosure defined by the attached claims and equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A stator comprising:
   a core body provided so as to contact a cylindrical peripheral-wall inner surface of a frame, the core body having a stator coil wound thereupon; and
   a pair of mold portions each in which a coil end of the stator coil is molded out of resin, the pair of mold portions being provided on opposite sides of the core body,
   wherein a gap is provided between the peripheral-wall inner surface and each of the pair of mold portions,
   wherein each of the pair of mold portions includes a bridge that is adjacent to the gap and that extends to and directly contacts the cylindrical peripheral-wall inner surface of the frame,
   wherein a cooling liquid path is provided at a peripheral wall of the frame, the cooling liquid path being provided within a predetermined area opposite the core body, and
   wherein the bridge is positioned within an area on the respective mold portions that corresponds to a width of the cooling liquid path on the frame.

2. The stator according to claim 1, wherein a groove depth of a portion of the cooling liquid path near the mold portion is greater than that of a remaining portion of the cooling liquid path.

3. The stator according to claim 1, wherein a sealant mounting groove is provided in an outer area of the predetermined area of the frame.

4. A rotating electrical machine comprising:
   the stator according to claim 1; and
   a rotor that is mounted to a rotary shaft so as to oppose the stator.

5. The rotating electrical machine according to claim 4, wherein a groove depth of a portion of the cooling liquid path near the mold portion is greater than that of a remaining portion of the cooling liquid path.

6. The rotating electrical machine according to claim 5, wherein the bridge is positioned within an area on the mold portion that corresponds to a width of the portion of the cooling liquid path that has the greater groove depth.

7. The rotating electrical machine according to claim 4, wherein a sealant mounting groove is provided in an outer area of the predetermined area of the frame.

8. The rotating electrical machine according to claim 4, wherein the bridge is formed at a core-body-side of the mold portion.

9. The rotating electrical machine according to claim 4, wherein the bridge directly contacts the core body.

10. The stator according to claim 1, wherein the bridge is formed at a core-body-side of the mold portion.

11. The stator according to claim 1, wherein the bridge directly contacts the core body.

12. A stator comprising:
    a core body provided so as to contact a cylindrical peripheral-wall inner surface of a frame, the core body having a stator coil wound thereupon; and
    a pair of mold portions each in which a coil end of the stator coil is molded out of resin, the pair of mold portions being provided on opposite sides of the core body,
    wherein a gap is provided between the peripheral-wall inner surface and each of the pair of mold portions,
    wherein each of the pair of mold portions includes a bridge that is adjacent to the gap and that extends to and directly contacts the cylindrical peripheral-wall inner surface of the frame,
    wherein a cooling liquid path is provided at a peripheral wall of the frame, the cooling liquid path being provided within a predetermined area opposite the core body,
    wherein a groove depth of a pair of portions of the cooling liquid path near the pair of mold portions is greater than that of a remaining portion of the cooling liquid path, and wherein the bridge is positioned within an area on the respective mold portions that corresponds to a width of the respective portions of the cooling liquid path that has the greater groove depth.

13. A rotating electrical machine comprising:
a stator comprising:
- a core body provided so as to contact a cylindrical peripheral-wall inner surface of a frame, the core body having a stator coil wound thereupon; and
- a pair of mold portions each in which a coil end of the stator coil is molded out of resin, the pair of mold portions being provided on opposite sides of the core body,
- wherein a gap is provided between the peripheral-wall inner surface and each of the pair of mold portions, and
- wherein each of the pair of mold portions includes a bridge that is adjacent to the gap and that extends to and directly contacts the cylindrical peripheral-wall inner surface of the frame; and a rotor that is mounted to a rotary shaft so as to oppose the stator, wherein a cooling liquid path is provided at a peripheral wall of the frame, the cooling liquid path being provided within a predetermined area opposite the core body, wherein a groove depth of a pair of portions of the cooling liquid path near the pair of mold portions is greater than that of a remaining portion of the cooling liquid path, and wherein the bridge is positioned within an area on the respective mold portions that corresponds to a width of the respective portions of the cooling liquid path that has the greater groove depth.

* * * * *